(12) United States Patent
Conran et al.

(10) Patent No.: US 8,174,528 B1
(45) Date of Patent: May 8, 2012

(54) RETAINING A SURFACE DETAIL

(75) Inventors: Patrick N. P. Conran, Corte Madera, CA (US); Domenico Porcino, San Rafael, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 1025 days.

(21) Appl. No.: 11/865,375

(22) Filed: Oct. 1, 2007

(51) Int. Cl.
*G06T 15/00* (2011.01)
(52) U.S. Cl. ........ 345/428; 345/419; 345/423; 345/424; 345/543; 345/582
(58) Field of Classification Search .................. 345/419, 345/423, 426, 428, 543, 582
See application file for complete search history.

(56) References Cited

U.S. PATENT DOCUMENTS

| | | | |
|---|---|---|---|
| 5,870,097 A * | 2/1999 | Snyder et al. ................. | 345/426 |
| 6,292,194 B1 * | 9/2001 | Powell, III ..................... | 345/582 |
| 6,426,750 B1 * | 7/2002 | Hoppe ........................... | 345/428 |
| 6,809,738 B2 * | 10/2004 | Hubrecht et al. .............. | 345/543 |
| 7,532,213 B2 * | 5/2009 | Sfarti ............................. | 345/423 |
| 7,538,769 B2 * | 5/2009 | Hoppe ........................... | 345/428 |
| 7,564,455 B2 * | 7/2009 | Gatewood et al. ............ | 345/419 |

OTHER PUBLICATIONS

Conran, Patrick, "SpecVar Maps: Baking Bump Maps into Specular Response (sketches_0416)." ACM SIGGRAPH 2005 Full Conference DVD-ROM, Industrial Light & Magic, 2005, 3 pages.
Ashton E. W. Mason and Edwin H. Blake, "Automatic Hierarchical Level of Detail Optimization in Computer Animation." The Eurographics Association, Blackwell Publishers, 1997. Eurographics '97, vol. 16, No. 3. 9 pages.
Conran, Patrick, "SpecVar Maps: Baking Bump Maps into Specular Response (sketches_0416)." Industrial Light & Magic, 2005, 1 page.

* cited by examiner

*Primary Examiner* — Phu Nguyen
(74) *Attorney, Agent, or Firm* — Fish & Richardson P.C.

(57) ABSTRACT

Among other disclosure, a computer-implemented method for retaining a surface detail includes identifying a surface that is to be used for generating an image in a rendering process. The surface includes polygons to be changed from an initial size to a larger size as the surface is changed to a lower resolution as part of tessellating the surface. The surface includes at least one surface detail smaller than the larger polygon size. The method includes storing information corresponding to at least a portion of the surface that includes polygons forming the surface detail. The method includes tesselating the surface, wherein the surface assumes the lower resolution. The method includes determining, while the image is at the lower resolution and using the stored information, a shading sample for at least one of the polygons of the larger size that includes the surface detail. The method includes storing the shading sample.

19 Claims, 4 Drawing Sheets

RETAINING A SURFACE DETAIL

TECHNICAL FIELD

This document relates to image processing.

BACKGROUND

Computer-based images are used in many situations. For example, servers, personal computers and video game consoles all use digital images in one or more applications. In some situations, images are used in animation, such as when a motion picture is produced or a video game is operated. In the former example, it is usually acceptable that image rendering takes a certain amount of time, because the rendering is done in advance of presenting the actual motion picture. In the latter example, by contrast, images must be rendered essentially in real time if the game is to be interactive and provide a realistic experience for the user.

The resolution of an object in a computer-generated image changes as the object becomes smaller. For example, this happens as the object moves away from the viewer in screenspace. This can result in a loss of detail. For example, if the object had been provided with small-scale visual characteristics at the higher resolution (such as with a displacement map), such details can be averaged out or entirely disappear as the object gets smaller.

SUMMARY

The invention relates to retaining a surface detail.

In a first aspect, a computer-implemented method for retaining a surface detail includes identifying a surface that is to be used for generating an image in a rendering process. The surface includes polygons to be changed from an initial size to a larger size as the surface is changed to a lower resolution as part of tessellating the surface. The surface includes at least one surface detail smaller than the larger polygon size. The method includes storing information corresponding to at least a portion of the surface that includes polygons forming the surface detail. The method includes tesselating the surface, wherein the surface assumes the lower resolution. The method includes determining, while the image is at the lower resolution and using the stored information, a shading sample for at least one of the polygons of the larger size that includes the surface detail. The method includes storing the shading sample.

Implementations can include any, all or none of the following features. The method can further include generating a map of where on the surface the surface detail is located; and storing the map separate from the surface. The method can further include accessing the map before storing the information; and identifying, using the accessed map, the information to be stored. The method can further include accessing the map after storing the information and before determining the shading sample; and identifying, using the accessed map, the stored information to be used in determining the shading sample. The method can further include defining a boundary that encloses the at least one of the polygons of the larger size; and using the boundary in accessing the stored information for determining the shading sample. The method can further include modifying at least one of a size and a shape of the boundary before using the boundary. The method can further include compressing the stored information; storing the compressed stored information in a hierarchy of multidimensional tree structures; and accessing the compressed stored information in the hierarchy of multidimensional tree structures as part of using the stored information in determining the shading sample. At least the compressing, storing of the compressed stored information and accessing can be performed in a real-time image generation process. The method can further include selecting the hierarchy of multidimensional tree structures before the storing of the compressed stored information based on at least one of a screen extent of the surface and available bandwidth. The compression can include at least one of: merging similarly oriented polygons; culling points where the surface contains no detail; and combinations thereof. The method can further include determining where the surface contains no detail by identifying where normals of the polygons satisfy a similarity criterion compared with a normal of the surface. The method can further include determining probability terms for each of multiple regions in the hierarchy to indicate a likelihood that the region should produce reflected light; and using the probability terms in accessing the compressed stored information. The method can further include determining a variation of surface orientation in the similarly oriented polygons; and taking the variation of surface orientation into account in determining the probability terms. The method can further include providing the surface at the lower resolution with the polygons forming the surface detail, wherein the polygons forming the surface detail are used in determining the shading sample.

In a second aspect, a computer program product is tangibly embodied in a computer-readable medium and includes instructions that when executed by a processor perform a method for retaining a surface detail. The method includes identifying a surface that is to be used for generating an image in a rendering process. The surface includes polygons to be changed from an initial size to a larger size as the surface is changed to a lower resolution as part of tessellating the surface. The surface includes at least one surface detail smaller than the larger polygon size. The method includes storing information corresponding to at least a portion of the surface that includes polygons forming the surface detail. The method includes tesselating the surface, wherein the surface assumes the lower resolution. The method includes determining, while the image is at the lower resolution and using the stored information, a shading sample for at least one of the polygons of the larger size that includes the surface detail. The method includes storing the shading sample.

In a third aspect, a system includes a polygon managing module providing a surface that is to be used for generating an image in a rendering process. The surface includes polygons to be changed from a current size to a larger size as the surface is changed to a lower resolution as part of tessellating the surface. The surface includes at least one surface detail smaller than the larger polygon size. The system includes a cache that is provided with information corresponding to at least a portion of the surface that includes polygons forming the surface detail. The system includes a light module that determines, while the image is at the lower resolution and using the cached information, a shading sample for at least one of the polygons of the larger size that includes the surface detail.

Implementations can include any, all or none of the following features. The system can further include a map of where on the surface the surface detail is located, stored separate from the surface. The system can be configured for use in a real-time image generation process, wherein the system compresses the cached information, stores the compressed cached information in a hierarchy of multidimensional tree structures, and accesses the compressed cached information in the hierarchy of multidimensional tree structures as part of using the cached information in determining the shading sample.

The system can further include a rendering module providing a rendered version of the surface generated using at least the shading sample.

Advantages of implementations can include any, all or none of the following. An improved image rendering process can be provided. Surface details can be retained when an object becomes smaller in screenspace. Image rendering in real-time implementations can be provided with retention of surface details.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

FIGS. 1A-E show a scene 100 that is part of generating an image in an animation process. The scene 100 schematically represents a computer-based image generation process. Ultimately, the image will be rendered into a viewable image and used for some purpose, such as to create an animated motion picture or the output of an interactive video game.

Figure 1:
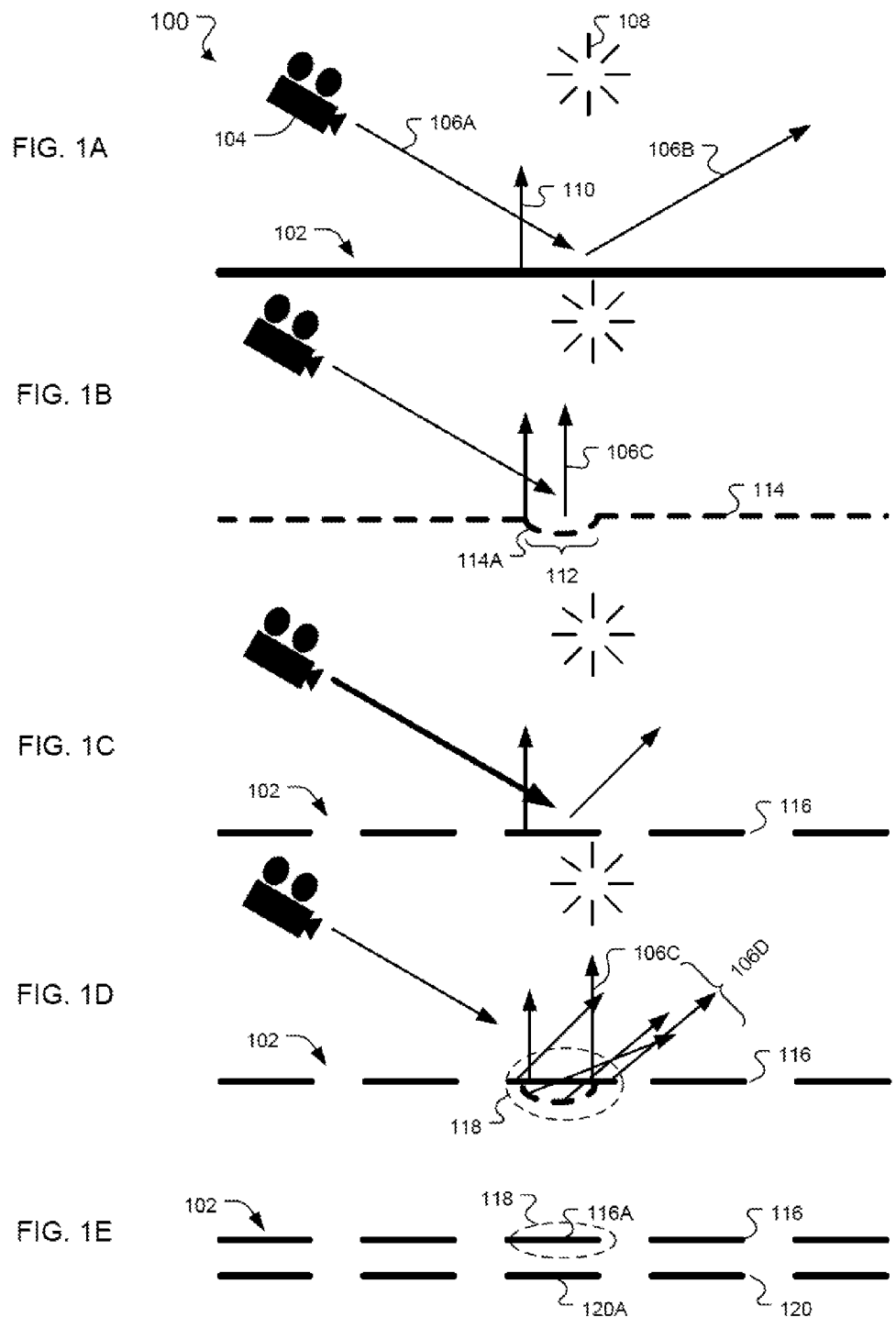
FIGS. 1A-E show examples of generating an image.

As shown in FIG. 1A, the scene 100 includes a surface 102 that is to be at least partially visible in the image. The surface can, for example, represent part of a character, object, landscape or other image feature. The portion of the surface 102 that is visible is determined by the position of a virtual camera 104. The camera 104 is not to be visible in the image and it is not part of the image. Rather, the camera 104 represents the elevation, distance and angle from which the surface 102 is to be seen in the finished image. That is, an observer of the finished image will see the surface 102 from the same viewpoint as does the camera 104.

The view of the camera 104 in this example is schematically illustrated using arrows 106A and 106B. Arrow 106A shows the direction from which the camera 104 is aimed at the surface 102. Arrow 106B, in turn, shows that the camera's view reaches further than just the point where it intersects the surface 102. This corresponds to light reflection in the surface 102. That is, incoming light from a remote light source (not shown) that travels toward the surface along the direction of the arrow 106B, will reflect upon reaching the surface. Some or all of the reflected light will then continue along the direction of the arrow 106A toward the camera 104. In some implementations, light characteristics can change as part of the reflection; for example, intensity and spectral distribution of the reflected light that hits the camera can be different from the incoming light. These and other changes depend on the nature of the surface 102, for example.

Light that impinges on the camera 104 will be registered as being part of the image. That is, the image as seen by the camera 104 includes not only the visual components of the surface 102 itself, but also contributions from light reflected on this surface. In other words, the camera registers the reflection seen on the surface.

The scene 100 here includes another light source 108, located approximately directly above the point where the arrow 106A impinges on the surface 102. The light source 108 generates outgoing light in one or more directions. For example, the light source can represent the sun or an object that is illuminated by the sun.

The camera 104 does not see the light source 108 in this example. In other words, the light from the light source that reflects on the surface 102 does not take the direction of the arrow 106A. This is because the light from the light source does not impinge on the camera along the direction of the arrow 106A. The reason for this, in turn, is that the surface 102 in the present example is relatively flat and does not contain any surface irregularities or other features. That is, the orientation of the surface 102 at all points is essentially perpendicular to a normal 110 of the surface 102. This means that no contribution from the light source 108 will be registered as part of the image according to the configuration shown in FIG. 1A.

However, if the surface 102 were provided with one or more surface details such that some of its points were oriented in a different direction relative to the normal 110, the camera 104 could see a contribution from the light source 108. FIG. 1B shows one such example. The surface has here been provided with a surface detail 112 that includes a slight indentation. For example, the surface detail 112 can represent a characteristic in the skin of a character, a property of the material that makes up an inanimate object, or a detail on a ground surface. In computer-based image generation, features such as the surface detail 112 can be used to make a surface more realistic. The surface detail 112 is sometimes considered to be a small-scale bump or scratch. The size, shape and orientation of the surface detail 112 are only exemplary and many other sizes, shapes and/or orientations can be used.

The surface 102 is here made up of polygons 114 situated next to each other. For the most part, the polygons are oriented perpendicularly to the normal 110, as mentioned earlier. However, polygons 114A that make up the surface detail 112 can have different orientations. Here, the surface detail is formed by three polygons 114A, of which the outer two are slanted relative to the normal 110 and the third middle one is approximately perpendicular to the normal, albeit at a different level than the rest of the polygons 114. The surface detail 112 can be provided by displacing those of the polygons 114 that occupy the area where the surface detail should be located, thus forming the polygons 114A, or by removing those original ones of the polygons 114 and replacing them with the polygons 114A, to name two examples.

The differently oriented polygons can provide light contributions to the image that are not obtained with the other polygons 114. For example, one or more of the outer polygons 114A can reflect light from the light source 108 such that it travels along the direction of the arrow 106A and thus is registered by the camera 104 as being included in the image. This is illustrated by an arrow 106C that represents the possibility that the camera will see the light source 108 as a reflection in at least part of the surface detail 112. This can be considered a glint of light that appears in the surface detail 112.

The polygons 114 and 114A are of the same size in the present example. Moreover, all of the polygons are relatively small and there is a relatively high number of polygons forming the surface. The polygon sizes correspond to the situation that the image here has a relatively high resolution. For example, this can occur when the character, item or landscape feature having the surface 102 is relatively close to the viewer, and therefore occupies a substantial portion of the image.

However, resolution can change over time, depending on surface location and other circumstances. Foe example, when tessellating the surface 102, the polygons will be made larger than their present size. Stated another way, two or more polygons having a relatively smaller size can be replaced with one relatively larger polygon when tessellation is performed. When the surface 102 recedes away from the viewer in screenspace, its resolution will be decreased so that it consists of fewer polygons. FIG. 1C shows an example of the surface after performing tessellation, when the surface has assumed the lower resolution. Here, there are fewer polygons than before and each of them is larger. That is, the surface 102 is now made up of polygons 116 having a larger size than the polygons 114 and 114A.

The change of the surface 102 from the higher resolution to the lower resolution can cause the surface details 112 to be lost. That is, a map or function that defines the location and appearance of the surface detail can be filtered as the surface 102 becomes smaller in screenspace, and the result can be to partially or completely average out the details. This causes the surface to be smoothened and any glints of light to be lost. If the image were to be rendered in the condition represented by the larger polygons 116, the camera 102 (and therefore the viewer) would not see the light source 108.

In some implementations, the surface detail 112 can be retained at the lower resolution using stored information. For example, the polygons 114A corresponding to the surface detail 112 can be stored while the surface is at the higher resolution and thereafter be provided to the surface at the lower resolution. FIG. 1D shows an example of this. Here, a boundary 118 has been defined that encloses one of the larger polygons 116. In some implementations, the boundary 118 represents the area in which to determine whether there existed any additional surface detail at the higher resolution that has now been replaced with just the one larger polygon 116. In this example, the surface detail 112 existed, at the higher resolution, within the area defined by the boundary 118. The surface can therefore be provided with the polygons 114A to replace the larger polygon.

With the different orientations of the smaller polygons 114A, the camera 102 can again see the light source 108, as indicated by the arrow 106C. This means that a shading sample generated for one of the larger polygons 116 that includes the smaller polygons 114A can be generated so that the shading sample includes a light contribution from the surface detail. The light contribution from the surface detail can be determined by looking up in the cache based on the larger polygon 116 that is currently being processed. The light contribution from the surface detail thus determined can be combined with a remainder of the light contribution for the larger polygon. For example, the surface detail contribution can be averaged with the remainder contribution to generate an overall shading sample (e.g., a color value) for the larger polygon. The surface detail can also provide glints from one or more other directions, as schematically illustrated by arrows 106D.

Accordingly, the image will now include details visible in the surface that were not present when only the larger polygons 116 were used. A rendered version of the image can then be generated based on the generated shading samples, which rendered version will show the light contributions (e.g., the glints) from one or more restored surface details.

The boundary 118 can be provided with different size, shape and/or orientation. This can reduce or eliminate the risk that irrelevant surface detail is inadvertently encompassed by the boundary 118. FIG. 1E shows an example where the object that is enclosed by the surface 102 is relatively thin. For example, the object represents a thin wall, plate of glass or a membrane. This means that not only the upper surface of the object can be visible (represented by large-size polygons 116), but also a lower surface. The lower surface is here defined by large-size polygons 120. Each of the polygons 116 and 120 may be located at a position where the surface had surface details at a higher resolution.

Assume, for example, that large-size polygon 120A is one such polygon; e.g., the surface initially had a bump or scratch also on the lower surface that has now been lost at the lower resolution. If the boundary 118 were to be applied, as part of restoring lost surface detail to a polygon 116A, with the size and shape the boundary had in FIG. 1D, there is a chance that previous surface detail corresponding to the large-size polygon 120A (which is located nearby the polygon 116A) would inadvertently be included in such detail restoration.

To counteract this and/or other problems, the size and/or shape of the boundary 118 can be modified before the surface detail is restored. In FIG. 1E it is seen that the boundary 118 has been provided with a flatter shape than before. Any kinds of size and/or shape adjustments can be made.

Figure 2:
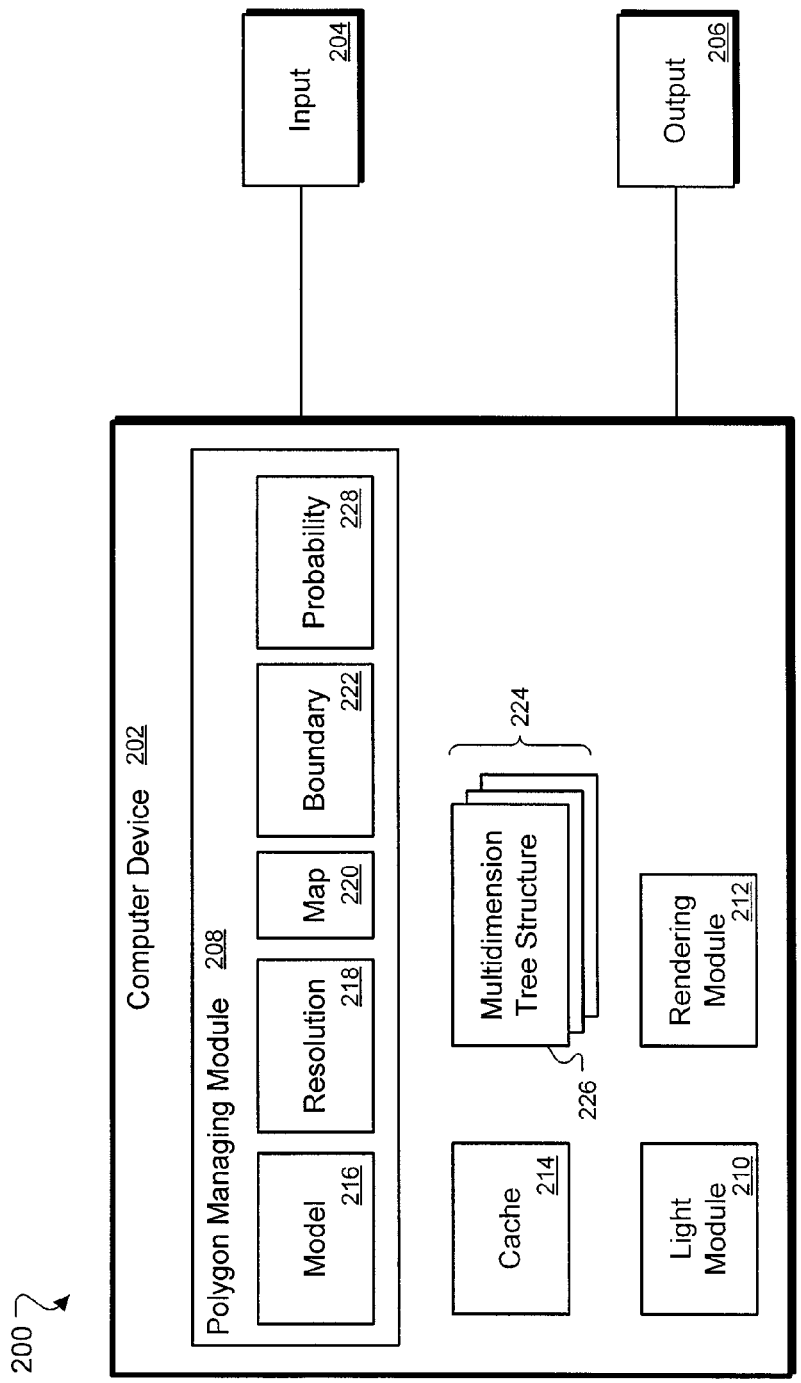
FIG. 2 shows an example of a system.

FIG. 2 shows an example of a system 200 that can be used for performing the processes described herein, to name some examples. The system includes a computer device 202 which can be any processor-based device, such as a server computer, a personal computer or a video game console. The computer device can be connected to one or more input devices 204, such as a keyboard, mouse or a game control. The computer device can provide output to one or more output devices 206, such as a display screen, a printer or a television set. For example, the system 200 can be used for generating images for an animated motion picture or for an interactive video game.

The computer device 202 here includes a polygon managing module 208 that manages polygons as part of an image-generating process. For example, the polygons shown in any or all of FIGS. 1A-E can be managed.

The computer device 202 here includes a light module 210 that can determine light contributions to an image and generate one or more shading samples based on the light contribution. For example, light contributions to the image captured by the camera 104 can be determined for each large-size polygon, and a corresponding shading sample can be stored.

The computer device 202 here includes a rendering module 212 that renders the image so that it can be seen by the viewer. The rendering module 212 can receive the shading samples as input and use them in the rendering. For example, a frame for an animated motion picture or a frame of an interactive game can be rendered.

The computer device 202 here includes a cache 214 that can be used for storing information at a higher resolution. For example, any or all surface detail information in FIGS. 1A-E can be stored in the cache 212. Any kind of computer-readable storage device can be used for the cache 214. For example, a point cloud cache can be defined and used in an implementation based on the shading language compatible with the PRMan product from Pixar Animation Studios. As another example, a multidimensional tree structure can be used.

The polygon managing module 208 can work with one or more models 216 as part of managing polygons. That is, the model 216 can define the geometry of a scene, such as any of the scenes in FIGS. 1A-E, and the module 208 can generate and manage the polygons making up such geometry through various object movements and transformations as required.

A resolution module 218 indicates the resolution of a surface at a given point. For example, the resolution in FIG. 1B is relatively high and the resolution in FIGS. 1C-E is relatively low. The sizes of the polygons and the resolution can vary in proportion to each other, as has been mentioned.

The computer device 202 here includes a map 220 of where the surface detail is located. The map 220 is stored separate from the surface. The map 220 can for example be used to ensure that only the surface detail (and not areas without surface detail) are cached. As another example, when the entire surface has been cached (i.e., also areas without surface detail), the map can be used to ensure that the lower-resolution surface is only provided with cached information for areas where surface detail actually occurs.

A boundary module 222 can provide a boundary for determining presence or absence of surface detail. For example, the boundary 118 as shown in FIGS. 1D-E can be provided. Resizing and/or reshaping of the boundary can be provided.

In some implementations, for example those intended to be used for a real-time image generation process, such as in an interactive video game, the computer device 202 can be provided with one or more hierarchies 224 of multidimensional tree structures 226. The structures 226 can be used to read from the cache 214, such as from a point cloud cache. The hierarchies 224 can receive information from the cache 214 that has been compressed, for example. Any compression technique can be used, in some implementations. Such compressed information in the hierarchy 224 can then be accessed as part of using the cached information, relating to the surface detail(s), in determining a light contribution. Any kind of multidimensional tree structure can be used. One or more multidimensional tree structures can be used also in implementations that are not configured for real-time image generation.

The computer device 202 can include a probability module 228 that can determine probability terms to be used in accessing cached information. For example, the probability terms can be used to indicate a likelihood that a particular surface detail should produce a glint of reflected light. This can reduce the chance that too many and/or too strong glints are produced.

The organizations of components in the computer device 202 is exemplary only. In other implementations, two or more components can be united into a common component. Also, one or more of the components can provide substantially similar functionality while being located at another device (not shown).

Figure 3:
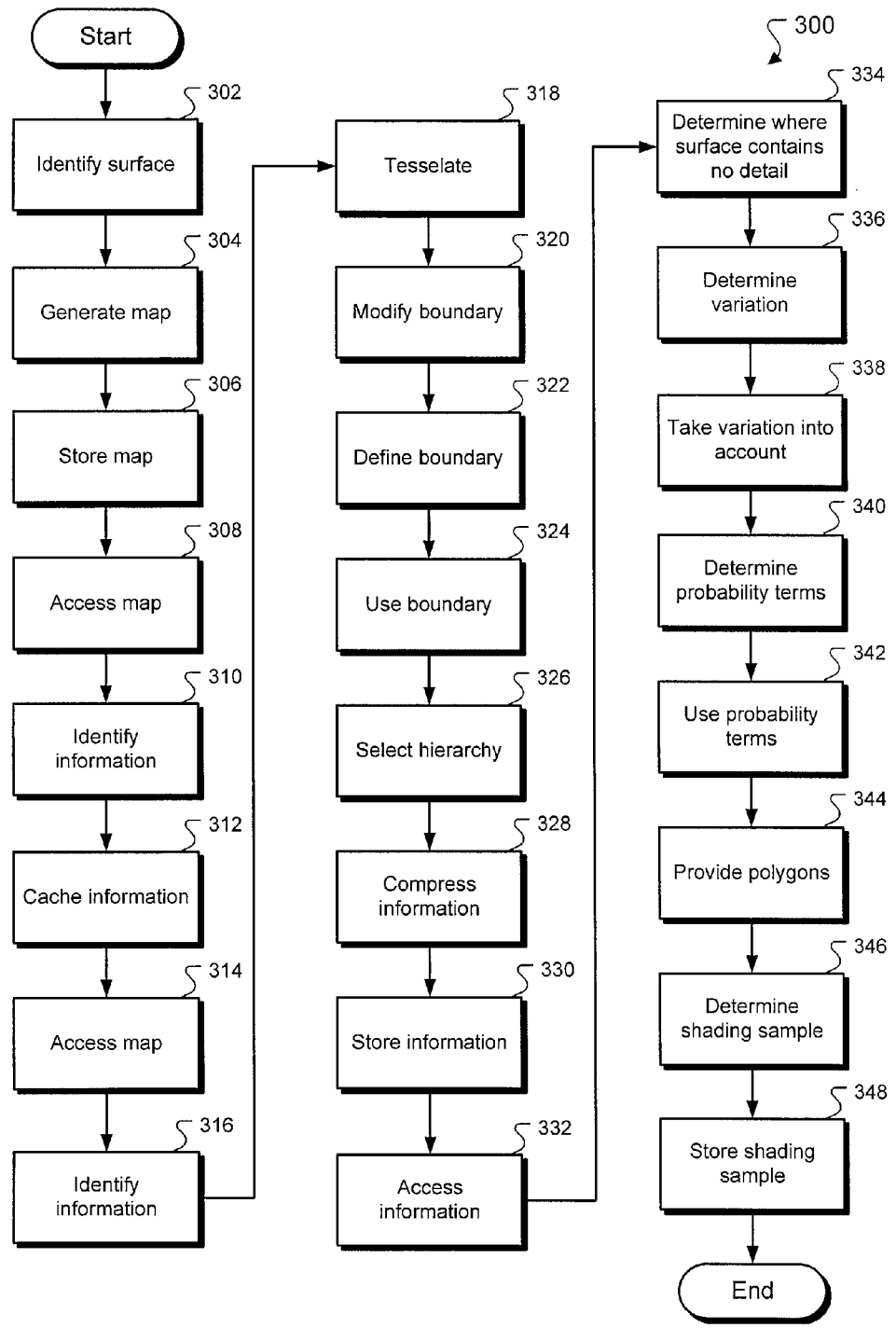
FIG. 3 shows an example of a flowchart.

FIG. 3 is a flow chart showing an exemplary method 300. Some or all of the method 300 can be performed in an image-generating process. Any or all steps of the method 300 can be performed by a processor executing instructions stored in a computer-readable storage medium, for example in the system 200.

The method 300 can begin in step 302 with identifying a surface that is to be used for generating an image in a rendering process. The surface includes polygons to be changed from an initial size to a larger size as the surface is changed to a lower resolution as part of tessellating the surface. The surface includes at least one surface detail smaller than the larger polygon size. For example, the surface 102 as shown in FIG. 1B can be identified.

In step 304, the method 300 can include generating a map of where on the surface the surface detail is located. For example, the map 220 can be generated to indicate the surface detail 112.

In step 306, the method 300 can include storing the map separate from the surface. For example, the polygon managing module 208 can store both the map 220 and the surface 102.

Steps 308 and 310 can be considered a caching-using-map approach. In step 308, the method 300 can include accessing the map before storing the information about a surface detail. For example, the map 220 can be accessed before information is stored in cache 214. In step 310, the method 300 can include identifying, using the accessed map, the information to be stored. For example, only the surface detail information indicated by the map 220 is stored in cache 214.

In step 312, the method 300 can include storing information corresponding to at least a portion of the surface that includes polygons forming the surface detail. For example, information about some or all of the surface 102, including the surface detail 112, can be stored in the cache 214.

Steps 314 and 316 can be considered an accessing-cache-using-map approach. In some implementations, the steps 314 and 316 are alternative to the steps 308 and 310. In step 314, the method 300 can include accessing the map after storing the information and before determining the light contribution. In step 316, the method 300 can include identifying, using the accessed map, the stored information to be used in determining the light contribution. For example, only the surface detail information in cache 214, as indicated by the map 220, is accessed.

In step 318, the method 300 can include tessellating the surface to the lower resolution. For example, the surface 102 can change from the resolution in FIG. 1B to the resolution in FIG. 1C as a result of tessellation. The tessellation can be performed by the polygon managing module 208.

In step 320, the method 300 can include modifying at least one of a size and a shape of the boundary before using the boundary. For example, the boundary module 222 can modify the boundary 118.

In step 322, the method 300 can include defining a boundary that encloses at least one of the polygons at the larger size. For example, the boundary 188 as shown in FIGS. 1D and/or 1E can be defined.

In step 324, the method 300 can include using the boundary in accessing the stored information for determining the light contribution. For example, the boundary 118 can be used to obtain surface detail information for the large-size polygon 116A from the cache 214.

Steps 326-342 can, among other examples, be used in implementations for more demanding processing, such as the rapid image generation and rendering necessary for real-time interactive operations. In step 326, the method 300 can include selecting a hierarchy of multidimensional tree structures before the storing of the compressed stored information based on at least one of a screen extent of the surface and available bandwidth. For example, the hierarchy 224 can be chosen so that it fits the surface 102 and/or based on the bandwidth available in the system 200 or elsewhere.

In step 328, the method 300 can include compressing the stored information. Compressing can include merging similarly oriented polygons, culling points where the surface contains no detail, and combinations thereof, to name a few examples. For example, those of the large-size polygons 116 that are similarly oriented can be merged. For example, some of the polygons 114 outside the surface detail 112 can be culled. The computer device 202 can compress information in the cache 214.

In step 330, the method 300 can include storing the compressed stored information in a hierarchy of multidimensional tree structures. For example, the hierarchy 224 can be used.

In step 332, the method 300 can include accessing the compressed stored information in the hierarchy of multidimensional tree structures as part of using the stored information in determining the light contribution. For example, the multidimensional tree structures 226 can be accessed in a real-time implementation. While steps 328-332 in this example are described in a real-time implementation, it is noted that multidimensional tree structures can be used in non-real-time implementations.

In step 334, the method 300 can include determining where the surface contains no detail by identifying where normals of the polygons satisfy a similarity criterion compared with a normal of the surface. For example, normals of the polygons 114 can be compared with the surface normal 110 according to any similarity criterion, such as whether the normals do not differ significantly.

In step 336, the method 300 can include determining a variation of surface orientation in the similarly oriented polygons. For example, the variation of surface orientation of some of the large-size polygons 116 can be determined.

Steps 338 and 340 relate to determining probability terms. In step 344, the method 300 can include taking the variation of surface orientation into account in determining the probability terms. In step 346, the method 300 can include determining probability terms for each of multiple regions in the hierarchy to indicate a likelihood that the region should produce reflected light. For example, the probability module 228 can be used.

In step 342, the method 300 can include using the probability terms in accessing the compressed stored information. For example, the probability terms can regulate the number and/or strength of glints produced.

In step 344, the method 300 can include providing the surface at the lower resolution with the polygons forming the surface detail, wherein the polygons forming the surface detail are used in determining the light contribution. For example, in the surface 102 shown in FIG. 1D, one or more of the larger polygons 116 can be replaced with the polygons 114A.

In step 346, the method 300 can include determining, while the image is at the lower resolution and using the stored information, a shading sample for at least one of the polygons of the larger size that includes the surface detail. For example, the light module 210 can determine a glint visible to the camera 104 as indicated by the arrow 106C.

In step 348, the method 300 can include storing the shading sample. For example, the rendering module 212 can render an image that includes the surface 102 at a lower resolution, wherein the light contribution of the light source 108 is present due to the surface detail 112.

The order and description of the steps in the method 300 are exemplary only. More or fewer steps, and/or performed in different order, can be used in some implementations.

Figure 4:
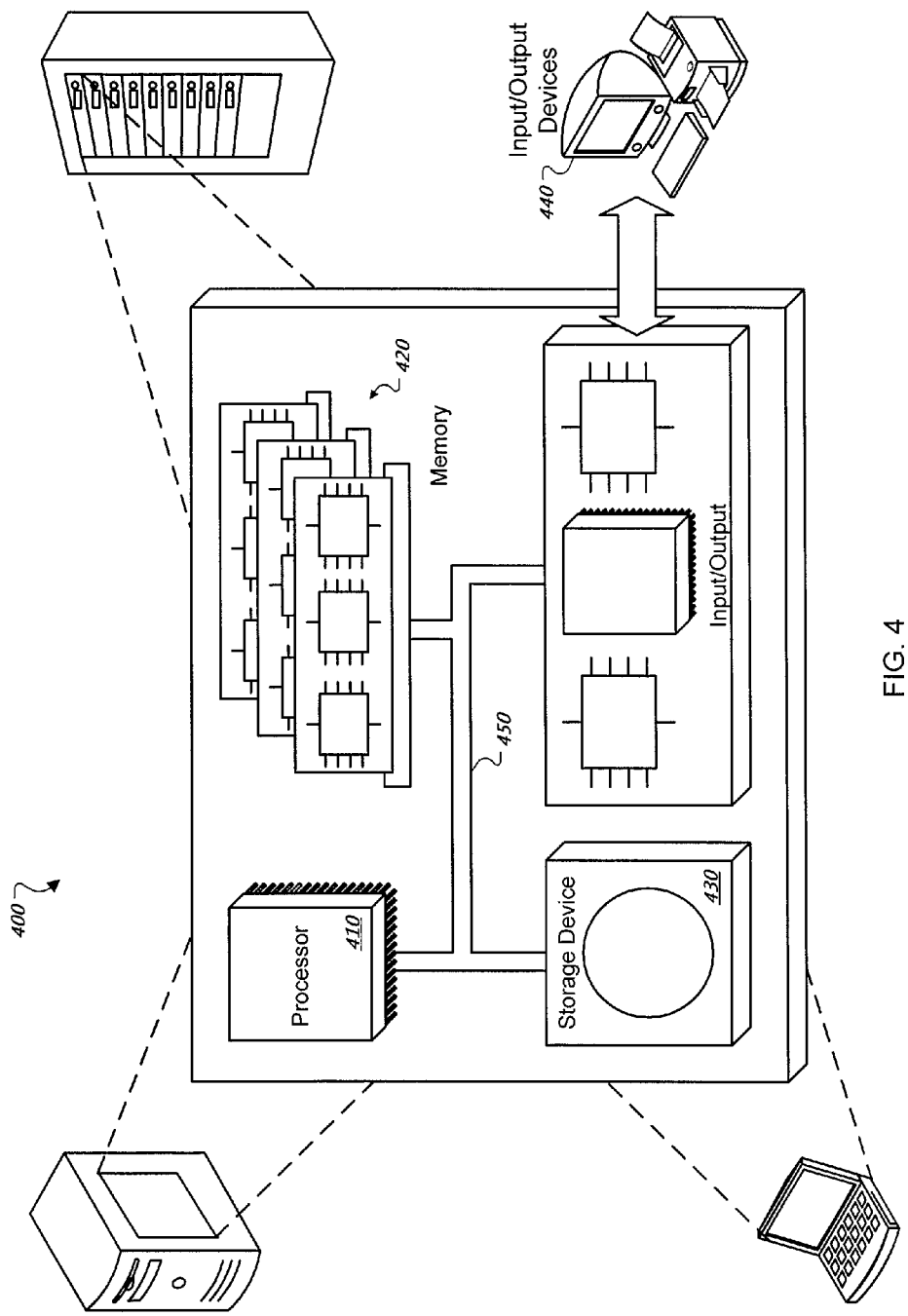
FIG. 4 is a schematic diagram of a computing system that can be used in connection with computer-implemented methods described in this document.

FIG. 4 is a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method for retaining a surface detail, the method comprising:
   identifying, using a computer device, a surface that is to be used for generating an image in a rendering process, the surface including polygons to be changed from an initial size to a larger size as the surface is changed to a lower resolution as part of tessellating the surface, wherein the surface includes at least one surface detail smaller than the larger polygon size;
   storing, in at least one storage device, information corresponding to at least a portion of the surface that includes polygons forming the surface detail;
   tessellating the surface using the computer device, wherein the surface assumes the lower resolution;
   determining, while the image is at the lower resolution and using the stored information and using the computer device, a shading sample for at least one of the polygons of the larger size that includes the surface detail; and
   storing the shading sample in the storage device.

2. The computer-implemented method of claim 1, further comprising:
   generating a map of where on the surface the surface detail is located; and
   storing the map separate from the surface.

3. The computer-implemented method of claim 2, further comprising:
   accessing the map before storing the information; and
   identifying, using the accessed map, the information to be stored.

4. The computer-implemented method of claim 2, further comprising:
   accessing the map after storing the information and before determining the shading sample; and
   identifying, using the accessed map, the stored information to be used in determining the shading sample.

5. The computer-implemented method of claim 1, further comprising:
   defining a boundary that encloses the at least one of the polygons of the larger size; and
   using the boundary in accessing the stored information for determining the shading sample.

6. The computer-implemented method of claim 5, further comprising modifying at least one of a size and a shape of the boundary before using the boundary.

7. The computer-implemented method of claim 1, further comprising:
   compressing the stored information;
   storing the compressed stored information in a hierarchy of multidimensional tree structures; and
   accessing the compressed stored information in the hierarchy of multidimensional tree structures as part of using the stored information in determining the shading sample.

8. The computer-implemented method of claim 7, wherein at least the compressing, storing of the compressed stored information and accessing are performed in a real-time image generation process.

9. The computer-implemented method of claim 7, further comprising:
   selecting the hierarchy of multidimensional tree structures before the storing of the compressed stored information based on at least one of a screen extent of the surface and available bandwidth.

10. The computer-implemented method of claim 7, wherein the compression comprises at least one of:
    merging similarly oriented polygons;
    culling points where the surface contains no detail; and
    combinations thereof.

11. The computer-implemented method of claim 10, further comprising:
    determining where the surface contains no detail by identifying where normals of the polygons satisfy a similarity criterion compared with a normal of the surface.

12. The computer-implemented method of claim 10, further comprising:
    determining probability terms for each of multiple regions in the hierarchy to indicate a likelihood that the region should produce reflected light; and
    using the probability terms in accessing the compressed stored information.

13. The computer-implemented method of claim 12, further comprising:
    determining a variation of surface orientation in the similarly oriented polygons; and
    taking the variation of surface orientation into account in determining the probability terms.

14. The computer-implemented method of claim 1, further comprising:
    providing the surface at the lower resolution with the polygons forming the surface detail, wherein the polygons forming the surface detail are used in determining the shading sample.

15. A computer program product tangibly embodied in a computer-readable medium and comprising instructions that when executed by a processor perform a method for retaining a surface detail, the method comprising:
    identifying, using a computer device, a surface that is to be used for generating an image in a rendering process, the surface including polygons to be changed from an initial size to a larger size as the surface is changed to a lower resolution as part of tessellating the surface, wherein the surface includes at least one surface detail smaller than the larger polygon size;

storing, in at least one storage device, information corresponding to at least a portion of the surface that includes polygons forming the surface detail;

tessellating the surface using the computer device, wherein the surface assumes the lower resolution;

determining, while the image is at the lower resolution and using the stored information and using the computer device, a shading sample for at least one of the polygons of the larger size that includes the surface detail; and storing the shading sample in the storage device.

16. A system comprising:

a processor; and a storage device having instructions that when executed by the processor generate:

a polygon managing module providing a surface that is to be used for generating an image in a rendering process, the surface including polygons to be changed from a current size to a larger size as the surface is changed to a lower resolution as part of tessellating the surface, wherein the surface includes at least one surface detail smaller than the larger polygon size;

a cache that is provided with information corresponding to at least a portion of the surface that includes polygons forming the surface detail; and a light module that determines, while the image is at the lower resolution and using the cached information, a shading sample for at least one of the polygons of the larger size that includes the surface detail.

17. The system of claim 16, further comprising:

a map of where on the surface the surface detail is located, stored separate from the surface.

18. The system of claim 16, configured for use in a real-time image generation process, wherein the system compresses the cached information, stores the compressed cached information in a hierarchy of multidimensional tree structures, and accesses the compressed cached information in the hierarchy of multidimensional tree structures as part of using the cached information in determining the shading sample.

19. The system of claim 16, further comprising:

a rendering module providing a rendered version of the surface generated using at least the shading sample.

* * * * *

UNITED STATES PATENT AND TRADEMARK OFFICE
CERTIFICATE OF CORRECTION

| | | |
|---|---|---|
| PATENT NO. | : 8,174,528 B1 | Page 1 of 1 |
| APPLICATION NO. | : 11/865375 | |
| DATED | : May 8, 2012 | |
| INVENTOR(S) | : Patrick N. P. Conran and Domenico Porcino | |

It is certified that error appears in the above-identified patent and that said Letters Patent is hereby corrected as shown below:

Column 2, Line 11 (Abstract), delete "tesselating" and insert -- tessellating --, therefor.

Signed and Sealed this
Third Day of July, 2012

David J. Kappos
*Director of the United States Patent and Trademark Office*